United States Patent
Mao et al.

(10) Patent No.: US 7,016,160 B2
(45) Date of Patent: Mar. 21, 2006

(54) DIFFERENTIAL CPP READER FOR PERPENDICULAR MAGNETIC RECORDING

(75) Inventors: Sining Mao, Savage, MN (US); Eric S. Linville, Chanhassen, MN (US); Nurul Amin, Woodbury, MN (US); Johannes Van Ek, Minnetonka, MN (US); Olle G. Heinonen, Eden Prairie, MN (US)

(73) Assignee: Seagate Technology LLC, Scott Valley, CA (US)

( * ) Notice: Subject to any disclaimer, the term of this patent is extended or adjusted under 35 U.S.C. 154(b) by 226 days.

(21) Appl. No.: 10/715,695

(22) Filed: Nov. 18, 2003

(65) Prior Publication Data

US 2005/0105219 A1 May 19, 2005

(51) Int. Cl.
*G11B 5/127* (2006.01)
(52) U.S. Cl. ..................................... 360/314
(58) Field of Classification Search ............... None
See application file for complete search history.

(56) References Cited

U.S. PATENT DOCUMENTS

| | | | |
|---|---|---|---|
| 4,589,041 A | 5/1986 | Voegeli | |
| 5,073,836 A | 12/1991 | Gill et al. | |
| 5,668,688 A | 9/1997 | Dykes et al. | |
| 5,751,521 A | 5/1998 | Gill | |
| 5,825,595 A * | 10/1998 | Gill ........................... | 360/314 |
| 5,828,525 A | 10/1998 | Iwasaki et al. | |
| 6,392,849 B1 | 5/2002 | Maruyama et al. | |
| 6,462,541 B1 | 10/2002 | Wang et al. | |
| 6,483,673 B1 | 11/2002 | Iwasaki et al. | |
| 6,643,103 B1 * | 11/2003 | Trindade ..................... | 360/314 |
| 2002/0044389 A1 | 4/2002 | Seigler et al. | |
| 2002/0075608 A1 | 6/2002 | Kawato | |
| 2002/0135954 A1 | 9/2002 | Yoshikawa et al. | |
| 2003/0011939 A1 | 1/2003 | Gill | |
| 2003/0214764 A1 * | 11/2003 | Sapozhnikov et al. . | 360/324.12 |
| 2004/0061981 A1 * | 4/2004 | Covington ............... | 360/324.1 |
| 2005/0024785 A1 * | 2/2005 | Gill et al. ................ | 360/323 |
| 2005/0041342 A1 * | 2/2005 | Huai et al. ............. | 360/324.12 |
| 2005/0073777 A1 * | 4/2005 | Hasegawa et al. .......... | 360/321 |
| 2005/0083613 A1 * | 4/2005 | Yoshikawa et al. ...... | 360/324.1 |
| 2005/0088786 A1 * | 4/2005 | Gill ......................... | 360/324.2 |

* cited by examiner

*Primary Examiner*—Allen Cao
(74) *Attorney, Agent, or Firm*—Kinney & Lange, P.A.

(57) ABSTRACT

A differential read head comprises one tri-layer reader or a plurality of tri-layer readers operating in a current perpendicular to plane (CPP) mode. The tri-layer readers each comprise a first free layer, a second free layer, and a nonmagnetic layer positioned therebetween. A nonmagnetic spacer is positioned between the plurality of tri-layer readers for electrically connecting the plurality of tri-layer readers in series such that a single CPP sense current representing a differential signal flows serially through the read head. With a single tri-layer reader, the free layers are spaced by a width substantially similar to the transition width of the magnetic medium.

22 Claims, 9 Drawing Sheets

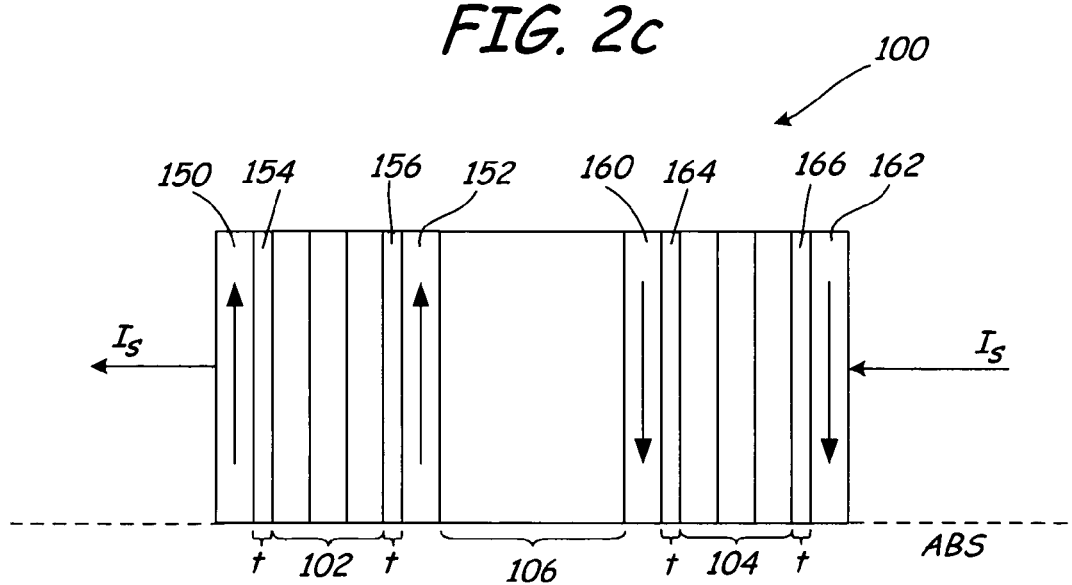
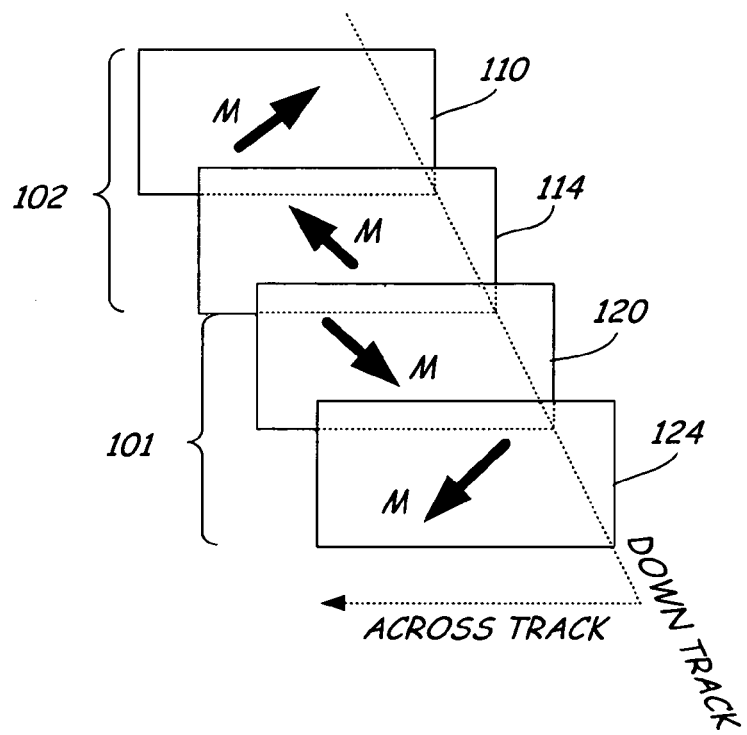

$\Delta R = \Delta R_{TR1} + \Delta R_{TR2} = 0$ $\Delta V \propto (R_{TR1} + \Delta R_{TR2})$

DIFFERENTIAL CPP READER FOR PERPENDICULAR MAGNETIC RECORDING

BACKGROUND OF THE INVENTION

The present invention relates generally to transducers for retrieval of data in magnetic recording disc drives. In particular, the present invention relates to a differential read head for perpendicular magnetic recording.

In a magnetic data storage and retrieval system, a magnetic read/write head typically includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc.

MR sensors have been developed that can be characterized in three general categories: (1) anisotropic magnetoresistive (AMR) sensors, (2) giant magnetoresistive (GMR) sensors, including spin valve sensors and multilayer GMR sensors, and (3) tunneling magnetoresistive (TMR) sensors.

AMR sensors generally have a single MR layer formed of a ferromagnetic material. The resistance of the MR layer varies as a function of $\cos^2 \alpha$, where $\alpha$ is the angle formed between the magnetization vector of the MR layer and the direction of the sense current flowing in the MR layer.

GMR sensors have a series of alternating magnetic and nonmagnetic layers. The resistance of GMR sensors varies as a function of the spin-dependent transmission of the conduction electrons between magnetic layers separated by a nonmagnetic conductive layer and the accompanying spin-dependent scattering which takes place at the interface of the magnetic and nonmagnetic layers and within the magnetic layers. The resistance of a GMR sensor depends on the relative orientations of the magnetization in consecutive magnetic layers, and varies as the cosine of the angle between the magnetization vectors of consecutive magnetic layers.

TMR sensors have a configuration similar to GMR sensors, except that the magnetic layers of the sensor are separated by a nonmagnetic insulating film thin enough to allow electron tunneling between the magnetic layers. The tunneling probability of an electron incident on the barrier from one magnetic layer depends on the character of the electron wave function and the spin of the electron relative to the magnetization direction in the other magnetic layer. As a consequence, the resistance of the TMR sensor depends on the relative orientations of the magnetization of the magnetic layers, exhibiting a minimum for a configuration in which the magnetizations of the magnetic layers are parallel and a maximum for a configuration in which the magnetizations of the magnetic layers are anti-parallel.

For all types of MR sensors, magnetization rotation occurs in response to magnetic flux from the disc. As the recording density of magnetic discs continues to increase, the width of the tracks on the disc must decrease, which necessitates smaller MR sensors. As MR sensors become smaller in size, particularly for sensors with dimensions less than about 0.1 micrometers ($\mu$m), the sensors have the potential to exhibit an undesirable magnetic response to applied fields from the magnetic disc. MR sensors must be designed in such a manner that even small sensors are free from magnetic noise and provide a signal with adequate amplitude for accurate recovery of the data written on the disc.

Perpendicular recording media generate asymmetric fields that are converted into voltage signals by magnetic flux-detecting magnetoresistive heads. In conventional disc drives using longitudinal recording media, the read head produces a unipolar pulse as the data stored in the recording medium transitions from one data state to another. When the same type of reader is used with a perpendicular medium, a bipolar pulse is produced as the reader passes the interface between a first data state (e.g., easy axis of magnetization pointing up) and a second data state (e.g., easy axis of magnetization pointing down). The circuitry used with disc drives has been developed to handle unipolar pulses, and handling bipolar pulses requires significant changes to the circuitry.

One proposed solution is to incorporate differentiators into the circuitry to convert the bipolar pulses into unipolar pulses, thereby allowing continued use of conventional circuitry. However, use of differentiators results in the amplification of noise at high frequencies. At high linear densities (smaller bits) and high data rates, electronic noise makes the use of differentiators impractical. Thus, there is a need for a perpendicular read head which may be used at high linear densities and which does not require electronic differentiation for signal processing.

BRIEF SUMMARY OF THE INVENTION

The present invention is a differential read head for perpendicular magnetic recording. One embodiment of the present invention comprises a plurality of tri-layer readers operating in a current perpendicular to plane (CPP) mode. The plurality of tri-layer readers each comprise a first free layer, a second free layer, and a nonmagnetic layer positioned therebetween. A nonmagnetic spacer means is positioned between the plurality of tri-layer readers for electrically connecting the tri-layer readers in series such that a single CPP sense current flows serially through the read head. The two free layers in each of the plurality of tri-layer readers preferably have magnetization directions which are oriented substantially antiparallel to each other and parallel to an air bearing surface (ABS) in a quiescent state. A bias is then preferably applied to each of the plurality of tri-layer readers perpendicular to the ABS. As a result, the two free layers in each of the plurality of tri-layer readers have biased magnetization directions substantially orthogonal with respect to each other.

In another embodiment, the differential read head includes a single tri-layer reader operating in a current perpendicular to plane (CPP) mode. The tri-layer reader comprises two free layers with a nonmagnetic layer positioned therebetween. The nonmagnetic layer is adjusted to have a substantially similar width at the ABS to a transition width of the magnetic medium. The differential read head further includes biasing means positioned with respect to the tri-layer reader for biasing a magnetization of the free layers substantially parallel to the ABS.

BRIEF DESCRIPTION OF THE DRAWINGS

FIG. 2c is a cross-section view of the differential read head of FIG. 1 with in-stack antiferromagnetic biasing for both tri-layer readers.

FIG. 3 shows an exploded perspective view of magnetizations of the free layers of the differential read head of FIG. 1 when biased as described in FIGS. 2a–2c.

DETAILED DESCRIPTION

Figure 1:
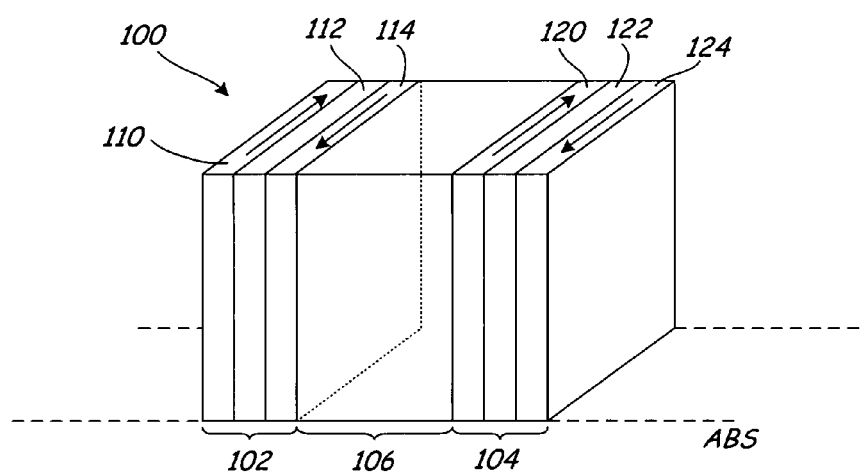
FIG. 1 is a perspective view of a differential read head according to one embodiment of the present invention in a quiescent state.

FIG. 1 is a perspective view of differential read head 100 according to one embodiment of the present invention in a quiescent state. Differential read head 100 includes a multi-layer planar structure consisting of two tri-layer readers 102 and 104 electrically connected in series by nonmagnetic spacer 106. Nonmagnetic spacer 106 physically defines the intrinsic linear resolution of differential read head 100. First tri-layer reader 102 includes first free layer 110, first nonmagnetic layer 112, and second free layer 114. Second tri-layer reader 104 includes third free layer 120, second nonmagnetic layer 122, and fourth free layer 124. Free layers 110, 114, 120, and 124 are preferably made of a soft ferromagnetic material, such as permalloy. Nonmagnetic layers 112 and 122 are preferably either made of a nonmagnetic metal such as Cu (thereby forming a CPP-spin valve tri-layer reader) or a tunnel barrier (thereby forming a CPP tunneling tri-layer reader). Optionally, if both nonmagnetic layers 112 and 122 are made of a nonmagnetic metal (that is, if both first tri-layer reader 102 and second tri-layer reader 104 are CPP spin valve tri-layer readers), nonmagnetic layers 112 and 122 may be nanostructured to increase the resistance-area product of the device.

First free layer 110 and second free layer 114 have quiescent state magnetizations which are antiparallel with respect to each other and parallel to an air bearing surface (ABS) of differential read head 100. Similarly, third free layer 120 and fourth free layer 124 have quiescent state magnetizations which are antiparallel with respect to each other and parallel to an air bearing surface (ABS) of differential read head 100. The quiescent state magnetization directions of the free layers are due to the shape anisotropy of the free layer materials. That is, the easy axes of magnetization of the free layers in a quiescent state point in a direction based on the aspect ratio of the free layers and the crystalline anisotropies of the free layer.

In operation, differential read head 100 is biased with biasing fields perpendicular to the ABS. More specifically, first tri-layer reader 102 is biased in a first direction perpendicular to the ABS, and second tri-layer reader 104 is biased perpendicular to the ABS in a direction opposite to the first direction. Examples of how differential read head 100 may be biased according to this configuration are shown in FIGS. 2a–2c.

Figure 2A:
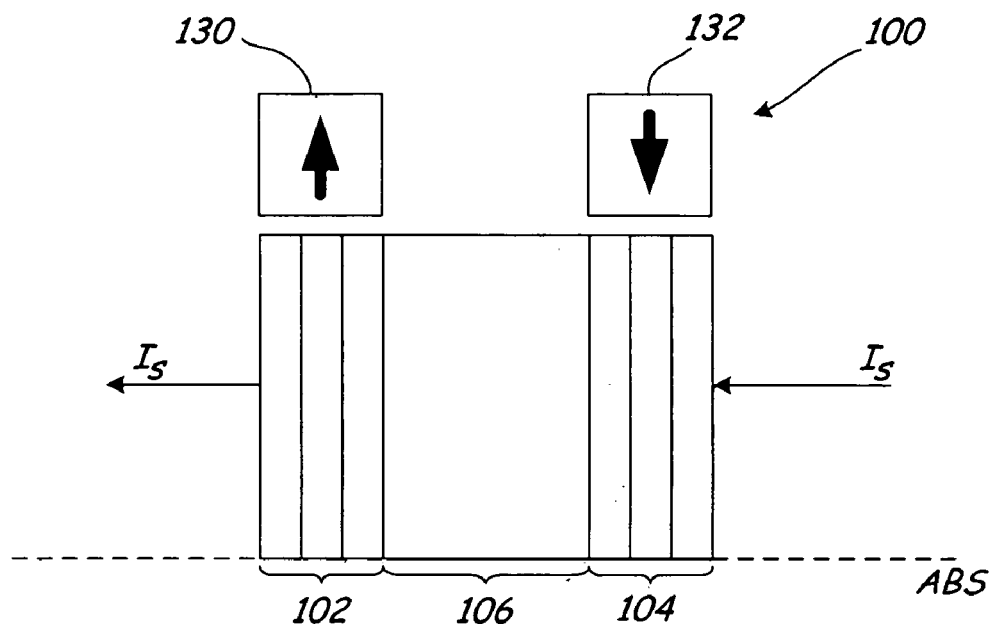
FIG. 2a is a cross-section view of the differential read head of FIG. 1 including two biasing permanent magnets.

FIG. 2a is a cross-section view of differential read head 100 including biasing permanent magnets 130 and 132. A sense current, $I_s$, flows perpendicular to the plane of the layers (CPP) of differential read head 100. Permanent magnet 130 is placed on a side of tri-layer reader 102 opposite the ABS, and permanent magnet 132 is placed on a side of tri-layer reader 104 opposite the ABS. Permanent magnets 130 and 132 have magnetization directions which are directed perpendicular with respect to the ABS and antiparallel with respect to each other, as is shown by the arrows on each of the permanent magnets. The magnetization directions of permanent magnets 130 and 132 are merely illustrative, and may be reversed for correct biasing according to the present invention. In a preferred embodiment, permanent magnets 130 and 132 are made of materials having different coercivities. To set the magnetizations of permanent magnets 130 and 132 to the desired direction, both permanent magnets 130 and 132 are first set in the same direction by exposing them to a strong magnetic field. Then, permanent magnets 130 and 132 are exposed to a magnetic field of opposite direction which is strong enough to reverse the magnetization of the permanent magnet with a lower coercivity. The effect of the biasing field produced by permanent magnets 130 and 132 on free layers 110, 114, 120, and 124 is described with respect to FIG. 3a.

Alternatively, one or both of permanent magnets 130 and 132 may be a laminated bilayer permanent magnet. The laminated bilayer permanent magnet preferably includes a layer of hard material having high anisotropy and a layer of soft magnetic material with a high moment. These two layers are separated by a metal such as Ru, which prevents direct exchange coupling between the two layers and promotes an antiferromagnetic coupling between the layers. This antiferromagnetic coupling will orient the soft layer perpendicularly to the hard layer.

Figure 2B:
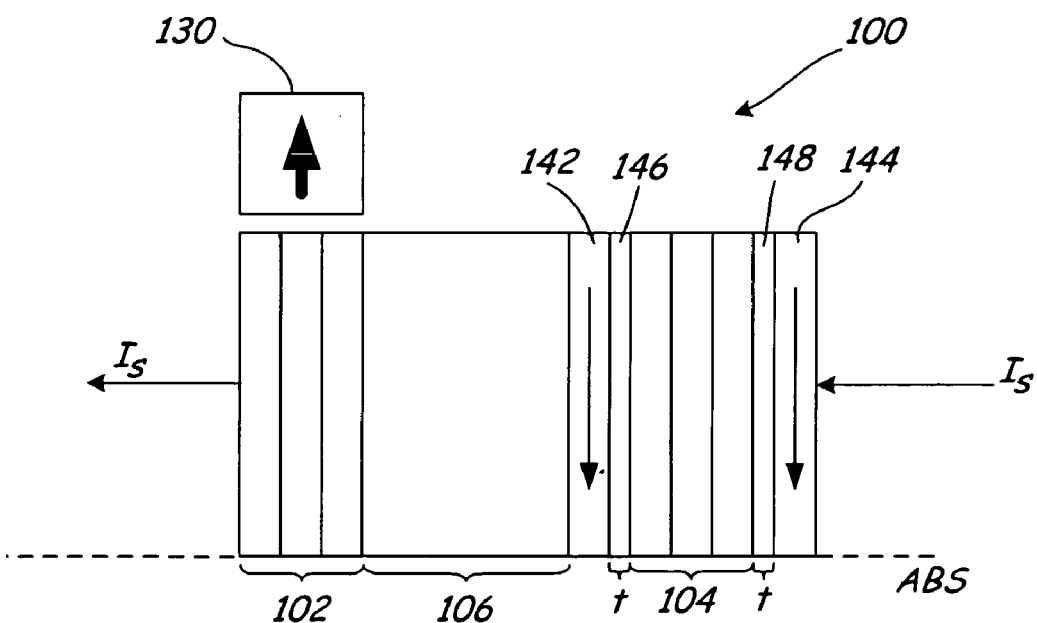
FIG. 2b is a cross-section view of the differential read head of FIG. 1 including permanent magnet biasing for one tri-layer reader and in-stack antiferromagnetic biasing for the other tri-layer reader.

FIG. 2b is a cross-section view of differential read head 100 including biasing by permanent magnet 140 for first tri-layer reader 102 and in-stack antiferromagnetic (AFM) biasing for second tri-layer reader 104. A sense current, $I_s$, flows perpendicular to the plane of the layers (CPP) of differential read head 100. The in-stack antiferromagnetic biasing includes first AFM layer 142 and second AFM layer 144. AFM layers 142 and 144 are preferably separated from tri-layer reader 104 by nonmagnetic spacer layers 146 and 148, respectively. By including nonmagnetic spacer layers 146 and 148, the exchange biasing strength between AFM layer 142 and free layer 120, and between AFM layer 144 and free layer 124, is adjustable by adjusting a thickness, t, of nonmagnetic spacer layers 146 and 148, respectively, along the ABS. The effect of the biasing field produced by permanent magnet 140 and AFM layers 142 and 144 on free layers 110, 114, 120, and 124 is described with respect to FIG. 3. It should be noted that the magnetization directions and positioning of permanent magnet 140 and AFM layers 142 and 144 are merely illustrative. That is, the magnetization directions of permanent magnet 140 and AFM layers 142 and 144 may be reversed for correct biasing according to the present invention. Furthermore, the positioning of permanent magnet 140 and AFM layers 142 and 144 may be switched such that AFM layers 142 and 144 bias tri-layer reader 102 and permanent magnet 140 biases tri-layer reader 104.

FIG. 2c is a cross-section view of differential read head 100 with in-stack antiferromagnetic biasing for both tri-layer readers. A sense current, $I_s$, flows perpendicular to the plane of the layers (CPP) of differential read head 100. Biasing for first tri-layer reader 102 includes first AFM layer 150 and second AFM layer 152. AFM layers 150 and 152 are preferably separated from first tri-layer reader 102 by non-magnetic spacer layers 154 and 156, respectively. Biasing for second tri-layer reader 104 includes third AFM layer 160 and fourth AFM layer 162. AFM layers 160 and 162 are preferably separated from second tri-layer reader 104 by nonmagnetic spacer layers 164 and 166, respectively. By including nonmagnetic spacer layers 154, 156, 164, and 166, the exchange biasing strength between the AFM layers and the free layers is adjustable by adjusting a thickness, t, of nonmagnetic spacer layers 154, 156, 164, and 166 along the ABS. Also, by choosing the materials of AFM layers 150 and 152 to be different from the materials of AFM layers 160 and 162 such that the different materials have different blocking temperatures, the exchange bias fields that AFM layers 150 and 152 exert on adjacent free layers 110 and 114, respectively, can be set in a direction opposite to the direction of the exchange bias fields that AFM layers 160 and 162 exert on adjacent free layers 120 and 124, respectively. The effect of the biasing field produced by AFM layers 150, 152, 160 and 162 on free layers 110, 114, 120, and 124, respectively, is described with respect to FIG. 3. It should be noted that the magnetization directions of AFM layers 150, 152, 160 and 162 are merely illustrative in that the magnetization directions of AFM layers 150, 152, 160 and 162 may be reversed for correct biasing according to the present invention.

FIG. 3 shows magnetizations M of free layers 110, 114, 120, and 124 when biased as described in FIGS. 2a–2c. As is shown, free layers 110 and 114 are preferably biased substantially orthogonal with respect to each other, and free layers 120 and 124 are preferably biased substantially orthogonal with respect to each other. With orthogonal biasing, the resistance of tri-layer readers 102 and 104 depends on the relative orientations of the magnetization in consecutive magnetic layers, and varies as the cosine of the angle between the magnetization vectors of consecutive magnetic layers. Thus, the resistance across tri-layer reader 102 varies as the cosine of the angle between the magnetization vectors of free layers 110 and 114. Similarly, the resistance across tri-layer reader 104 varies as the cosine of the angle between the magnetization vectors of free layers 120 and 124.

In operation, differential read head 100 flies over the surface of a rotating magnetic disc as a portion of a merged magnetic read/write head. As differential read head 100 passes over the disc, flux having varying magnetic field directions is emanated from the disc, representing different states of data that are written to the disc. This is known as bit flux. As the ABS of first tri-layer reader 102 confronts flux emanating from the disc, the angle of magnetization between first free layer 110 and second free layer 114 changes depending on the state of data at the ABS of first tri-layer reader 102. Similarly, as the ABS of tri-layer reader 104 confronts flux emanating from the disc, the angle of magnetization between first free layer 120 and second free layer 124 changes depending on the state of data at the ABS of second tri-layer reader 104. As differential read head 100 flies over the surface of the rotating disc, first tri-layer reader 102 and second tri-layer reader 104 are positioned over adjacent bits, and nonmagnetic spacer 106 straddles the transition between the adjacent bits. Typically, the width of nonmagnetic spacer 106 at the ABS is about 1–50 nm. When the angle of magnetization between the free layers changes, the resistance across differential read head 100 also changes. Sense current $I_s$ (FIGS. 2a–2c) is passed perpendicular to the layers of differential read head 100, and a voltage across the differential read head 100 is measured to detect this change in resistance with the changing magnetic field at the ABS. The voltage change is proportional to the change in resistance across differential read head 100.

Figure 4A:
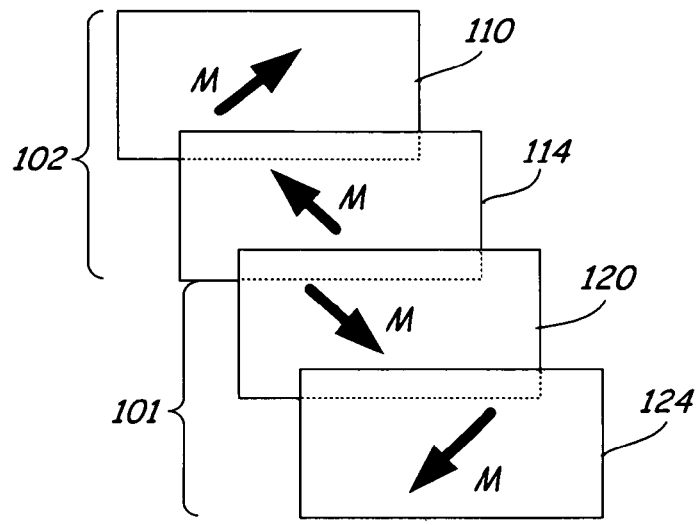
FIGS. 4a and 4b show exploded perspective views of the free layers in FIG. 3 when under the influence of flux emanating from the rotating magnetic disc.
Figure 4B:
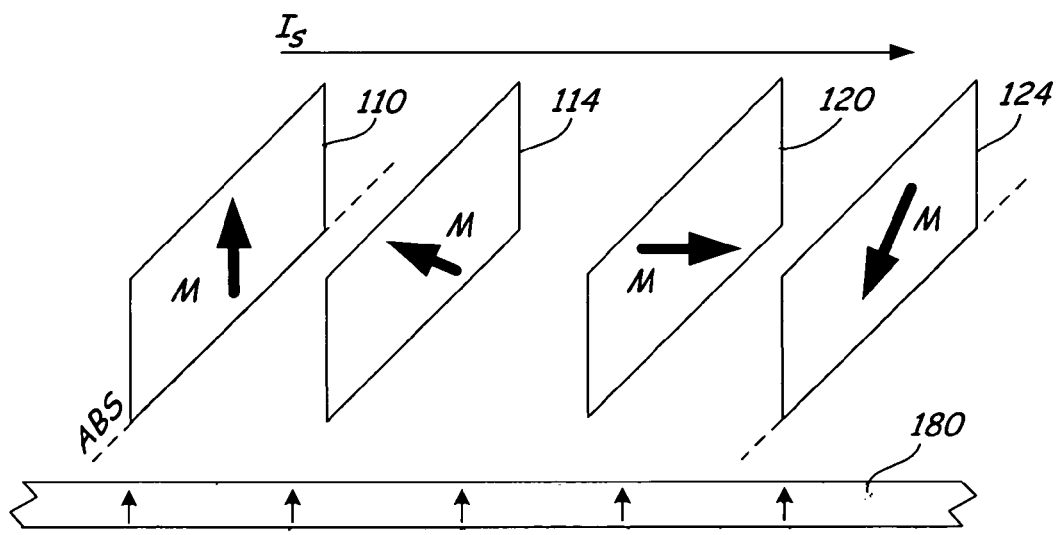

FIGS. 4a and 4b show different exploded perspective views of free layers 110, 114, 120, and 124 of FIG. 3 when under the influence of flux emanating from rotating magnetic disc 180. More specifically, FIGS. 4a and 4b shows the case where first tri-layer reader 102 and second tri-layer reader 104 are positioned over adjacent bits having the same magnetic state. In the example shown, first tri-layer reader 102 and second tri-layer reader 104 are positioned over adjacent bits having magnetizations which both point from the ABS toward differential read head 100 (as is shown in FIG. 4b). As a result, the angle of magnetization between free layers 110 and 114 becomes smaller and the angle of magnetization between free layers 120 and 124 becomes larger. Sense current $I_s$ is passed through differential read head 100 to determine the change in resistance across differential read head 100. The change in resistance (ΔR) is equal to the sum of the change in resistance across first tri-layer reader 102 ($\Delta R_{TL1}$) and second tri-layer reader 104 ($\Delta R_{TL2}$). In the case shown in FIGS. 4a and 4b, the change in resistance across first tri-layer reader 102 cancels the change in resistance across second tri-layer reader 104. As a result, the change in resistance across differential read head 100 is zero ($\Delta R = \Delta R_{TL1} + \Delta R_{TL2} = 0$). Thus, because the change in voltage is proportional to the change in resistance across differential read head 100, there is no change in voltage across differential read head 100.

Figure 5A:
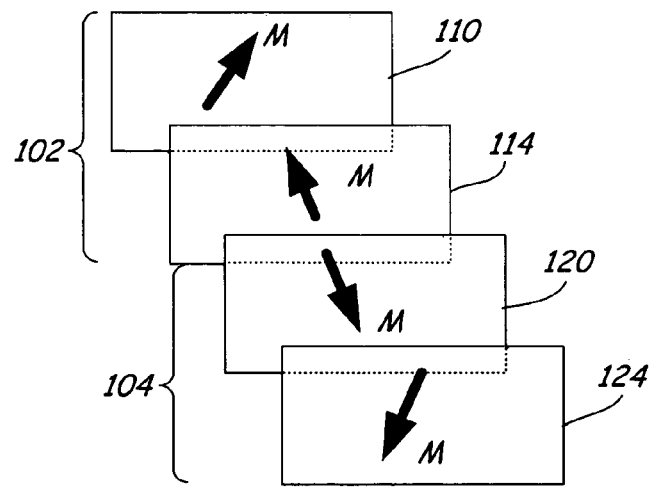
FIGS. 5a and 5b show exploded perspective views of the free layers in FIG. 3 when positioned over a data transition on the rotating magnetic disc.
Figure 5B:
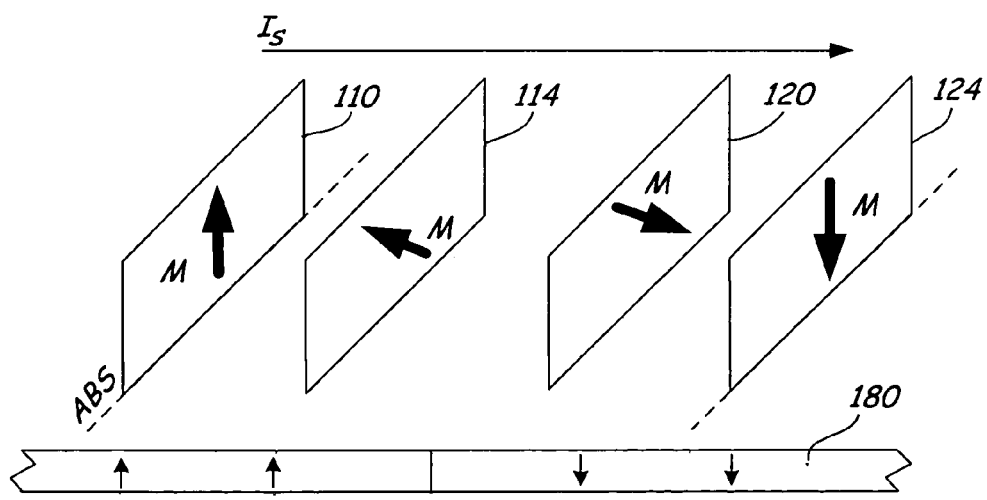

FIGS. 5a and 5b show different exploded perspective views of free layers 110, 114, 120, and 124 of FIG. 3 when under the influence of flux emanating from the rotating magnetic disc. More specifically, FIGS. 5a and 5b show the case where first tri-layer reader 102 and second tri-layer reader 104 are positioned over adjacent bits having the opposite magnetic states. In the example shown, first tri-layer reader 102 is positioned over a bit having a magnetization which points from the ABS toward differential read head 100, and second tri-layer reader 104 is positioned over a bit having a magnetization which points from the ABS away from differential read head 100 (as is shown in FIG. 5b). As a result, the angle of magnetization between free layers 110 and 114 and the angle of magnetization between free layers 120 and 124 both become smaller. Sense current $I_s$ is passed through differential read head 100 to determine the change in resistance across differential read head 100. The change in resistance (ΔR) is equal to the sum of the change in resistance across first tri-layer reader 102 ($\Delta R_{TL1}$) and second tri-layer reader 104 ($\Delta R_{TL2}$). In the case shown in FIGS. 5a and 5b, the change in resistance across first tri-layer reader 102 added to the change in resistance across second tri-layer reader 104 does not equal zero ($\Delta R = \Delta R_{TL1} +$ $\Delta R_{TL2} \neq 0$). Thus, because the change in voltage is proportional to the change in resistance across differential read head 100, a change in voltage is detected across differential read head 100. External circuitry then converts this voltage information into an appropriate format and manipulates that information as necessary to recover the information encoded on the disc.

Differential read head 100 potentially has several times higher signal amplitude (the voltage change detected across the differential read head 100) than that of a similar structure in a current-in-plane (CIP) geometry for several reasons.

Figure 6A:
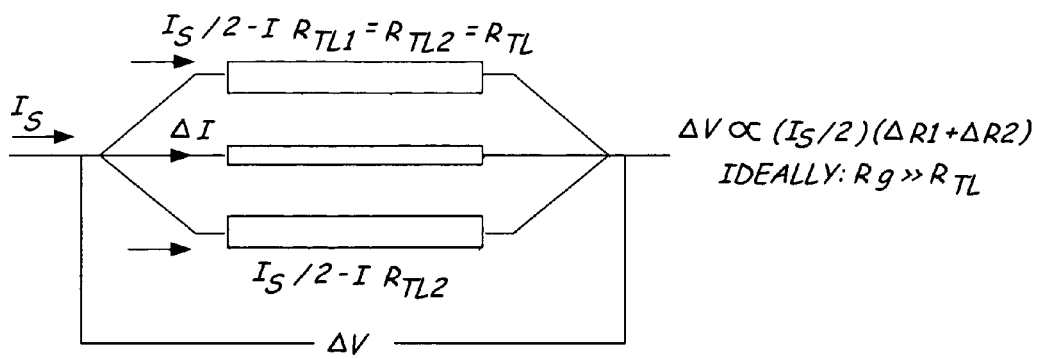
FIG. 6a shows an electrical circuit equivalent of a current-in-plane (CIP) differential dual spin valve head.
Figure 6B:
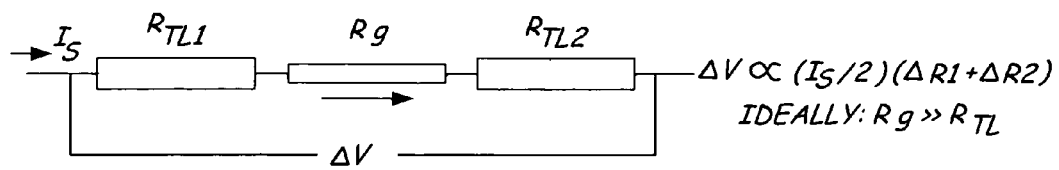
FIG. 6b shows an electrical circuit equivalent of a CPP differential dual spin valve head according to the present invention.

First, as shown by the equivalent electrical circuits shown in FIGS. 6a and 6b, in the CIP geometry (FIG. 6a), the tri-layer readers are electrically connected in parallel, while in the CPP geometry, the tri-layer readers are connected in series (FIG. 6b). The series connection is advantageous in the sense that the same electrical current ($I_s$) flows in both tri-layer readers 102 and 104 (represented in FIG. 6b by resistances $R_{TL1}$ and $R_{TL2}$, separated by the resistance, $R_g$, of nonmagnetic spacer 106) even if they have different electrical resistances. Moreover, the voltage signal is proportional to the sum of the product of current with resistance change of each tri-layer reader 102 and 104. In contrast, in the CIP geometry (FIG. 6a), the current, $I_s$, is divided between the two tri-layer readers ($R_{TL1}$ and $R_{TL2}$) and the nonmagnetic spacer ($R_g$). In the CIP geometry, the voltage signal is proportional to the sum of the product of about half of the current with resistance change of each tri-layer reader. Ideally, in the CIP geometry, the resistance of nonmagnetic spacer 106 ($R_g$) is much greater than the resistance of the tri-layer readers 102 and 104 ($R_{TL}$), whereas in the CPP geometry, $R_g$ is of the order or less than $R_{TL}$.

Second, the CPP GMR ratio for spin-dependent scattering can be two to ten times higher than that in the CIP geometry.

Third, for the same layer thickness, active area and current density, the CPP geometry allows, in most practical cases, higher current to be applied to the head than the CIP geometry does.

Figure 7:
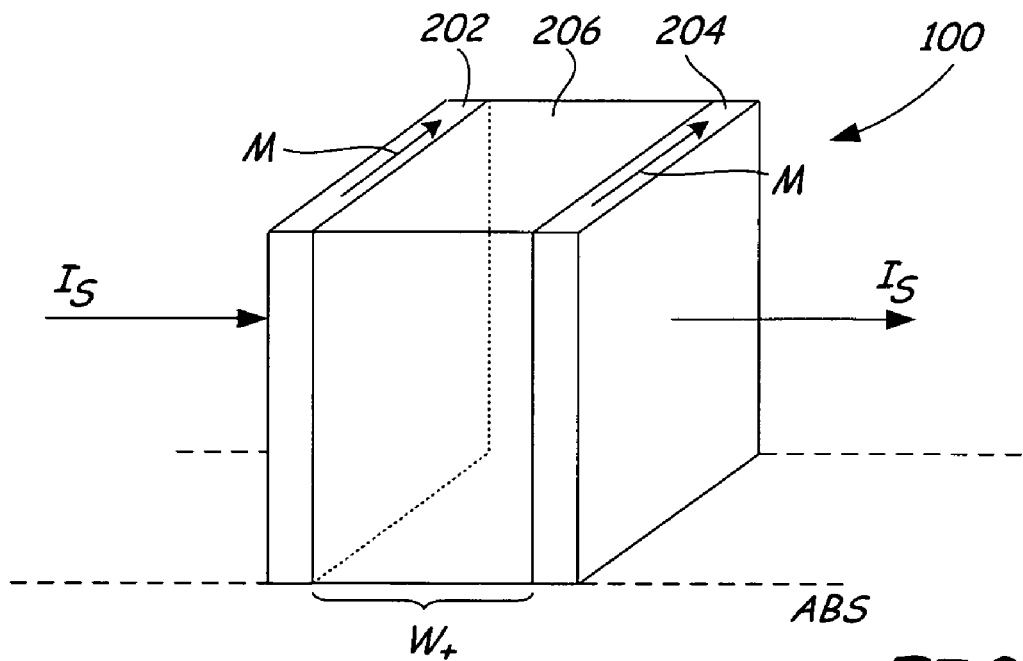
FIG. 7 is a perspective view of a differential read head according to another embodiment of the present invention in a quiescent state.

FIG. 7 is a perspective view of differential read head 200 according to another embodiment of the present invention. Differential read head 200 includes a multi-layer planar structure consisting of a single tri-layer reader. The tri-layer reader includes first free layer 202, second free layer 204, and nonmagnetic layer 206 positioned between the free layers. Nonmagnetic spacer 206 physically defines the intrinsic linear resolution of differential read head 200. Free layers 202 and 204 are preferably made of a soft ferromagnetic material, such as permalloy. Nonmagnetic layer 206 is preferably either a nonmagnetic metal such as Cu (thereby forming a CPP-spin valve tri-layer reader) or a tunnel barrier (thereby forming a CPP tunneling tri-layer reader). Also, nonmagnetic layer 206 may be a bi-layer structure including a nonmagnetic metal and a tunnel barrier.

First free layer 202 and second free layer 204 have magnetizations which are parallel with respect to each other and parallel to an air bearing surface (ABS) of differential read head 200. The magnetization directions, M, of the free layers are due to either the shape anisotropy of the free layers or due to external biasing of the free layers.

In the latter case, differential read head 200 is biased with biasing fields parallel to the ABS. Biasing of differential read head 200 is substantially similar to biasing of differential read head 100 of FIGS. 2a–2c. For example, differential read head 200 may be biased with a single permanent magnet having a magnetization set parallel to the ABS. Also, differential read head 200 may be biased by exchange bias coupling an antiferromagnetic (AFM) layer to each of the free layers (with a spacer positioned between each AFM and free layer to control exchange bias strength). Finally, a biasing may be applied outside the active area of the tri-layer reader by, for example, exchange tabs.

Figure 8:
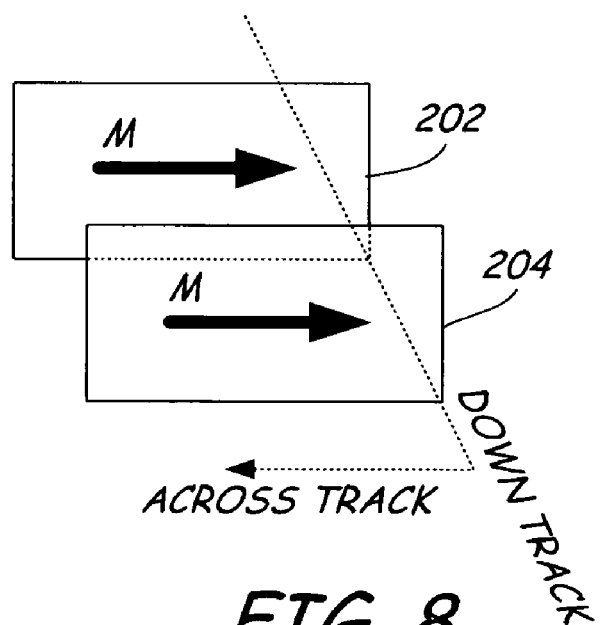
FIG. 8 shows an exploded perspective view of magnetizations of the free layers of the differential read head of FIG. 7 when not under the influence of bit flux.

FIG. 8 shows magnetizations, M, of free layers 202 and 204 when not under the influence of bit flux. As is shown, free layers 202 and 204 are preferably biased or set substantially parallel with respect to each other and with respect to the ABS. The resistance of differential read head 200 depends on the relative orientations of the magnetizations in free layers 202 and 204, and varies as the cosine of the angle between them.

In operation, differential read head 200 flies over the surface of a rotating magnetic disc as a portion of a magnetic read/write head. As differential read head 200 passes over the disc, flux having varying magnetic field directions is emanated from the disc, representing different states of data that are written to the disc. As the ABS of differential read head 200 confronts flux emanating from the disc, the angle of magnetization between first free layer 202 and second free layer 204 changes depending on the state of data at the ABS of differential read head 200. As differential read head 200 flies over the surface of the rotating disc, first free layer 202 and second free layer 204 are positioned over adjacent bits. This occurs because nonmagnetic layer 206 has a width, $w_t$, substantially equal to a transition width of the magnetic medium (not to scale). Typically, nonmagnetic layer 206 has a width $w_t$ of about 20–100 nm, a width range substantially similar to that of conventional CPP readers. When the angle of magnetization between free layers 202 and 204 changes, the resistance across differential read head 200 also changes. Sense current $I_s$ is passed perpendicular to the layers of differential read head 200 (CPP), and a voltage across the differential read head 200 is measured, to detect this change in resistance with the changing magnetic field at the ABS. The voltage change is proportional to the change in resistance across differential read head 200.

Figure 9A:
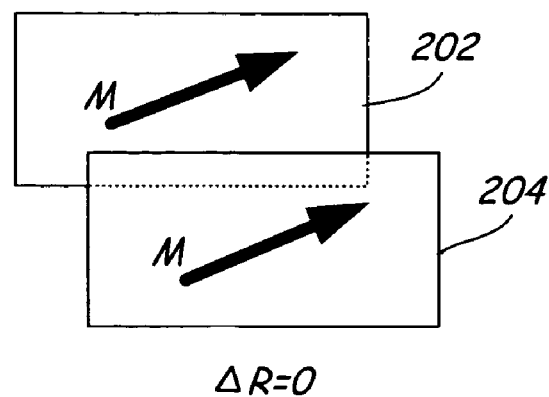
FIGS. 9a and 9b show exploded perspective views of the free layers in FIG. 8 when under the influence of flux emanating from the rotating magnetic disc.
Figure 9B:
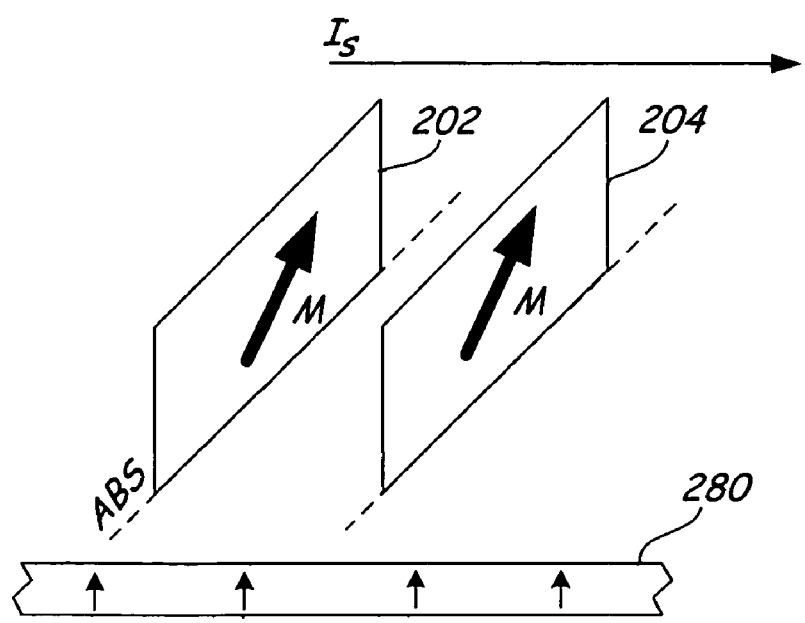

FIGS. 9a and 9b show different exploded perspective views of free layers 202 and 204 of FIG. 8 when under the influence of bit flux emanating from rotating magnetic disc 280. More specifically, FIGS. 9a and 9b show the case where first free layer 202 and second free layer 204 are positioned over adjacent bits having the same magnetic state. In the example shown, first free layer 202 and second free layer 204 are positioned over adjacent bits having easy axes of magnetization which point from the ABS toward differential read head 200 (as is shown in FIG. 9b). As a result, the magnetization directions of free layers 202 and 204 both rotate in the same direction, and the angle between them remains at zero. Sense current $I_s$ is passed through differential read head 200 to determine the change in resistance across differential read head 200. In the case shown in FIG. 6b, the change in resistance across differential read head 200 is zero ($\Delta R = 0$), since the angle of magnetization between free layers 202 and 204 remains unchanged. Thus, because the change in voltage is proportional to the change in resistance across differential read head 200, there is no change in voltage across differential read head 200.

Figure 10A:
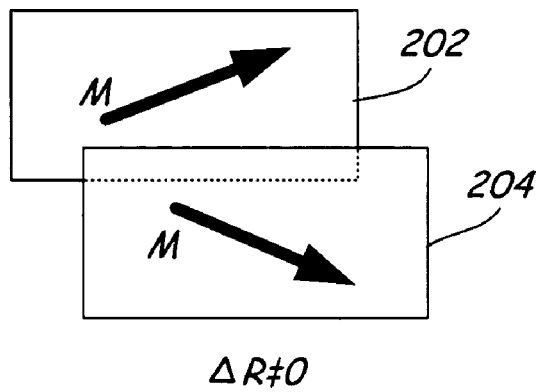
FIGS. 10a and 10b show exploded perspective views of the free layers in FIG. 8 when positioned over a data transition on the rotating magnetic disc.
Figure 10B:
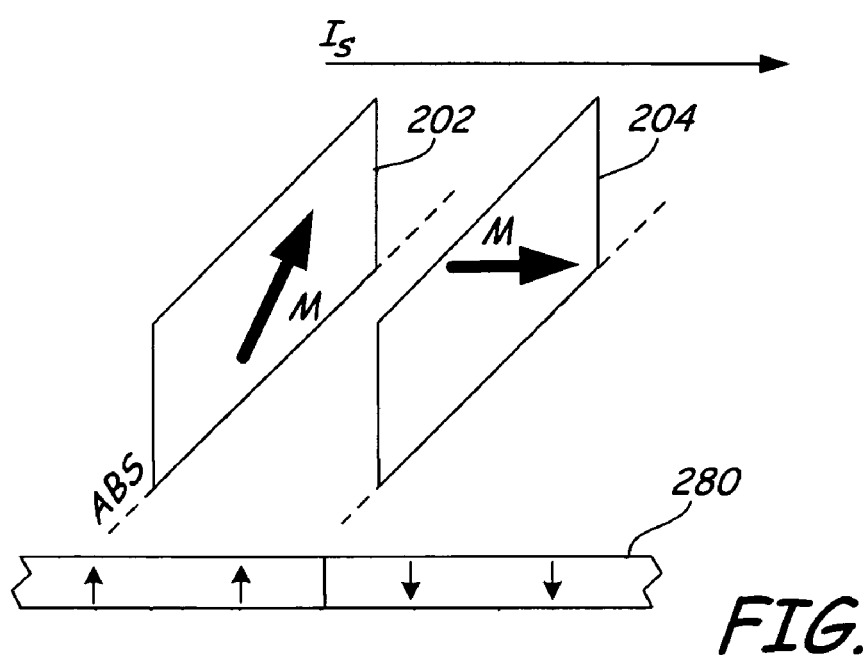

FIGS. 10a and 10b show different exploded perspective views of free layers 202 and 204 of FIG. 8 when under the influence of flux emanating from the rotating magnetic disc. More specifically, FIGS. 10a and 10b show the case where first free layer 202 and second free layer 204 are positioned over adjacent bits having the opposite magnetic states. In the example shown, first free layer 202 is positioned over a bit having a magnetization which points from the ABS toward differential read head 200, and second free layer 204 is positioned over a bit having a magnetization which points from the ABS away from differential read head 200 (as is shown in FIG. 10b). As a result, the magnetizations of free layers 202 and 204 rotate in opposite directions, and the angle of magnetization between free layers 202 and 204 becomes larger. Sense current $I_s$ is passed through differential read head 200 to determine the change in resistance across differential read head 200. In the case shown in FIGS. 10a and 10b, a change in resistance across differential read head 200 occurs because the resistance across differential read head 200 is a function of the cosine of the magnetization angle between free layers 202 and 204. Because the magnetization angle between free layers 202 and 204 changed from zero to non-zero, a change in resistance across differential read head 200 occurs ($\Delta R \neq 0$). Thus, because the change in voltage is proportional to the change in resistance across differential read head 200, a change in voltage is detected across differential read head 200. External circuitry then converts this voltage information into an appropriate format and manipulates that information as necessary to recover the information encoded on the disc.

The present invention is a differential read head for perpendicular magnetic recording. One embodiment of the present invention comprises a plurality of tri-layer readers operating in a current perpendicular to plane (CPP) mode. The plurality of tri-layer readers each comprise a first free layer, a second free layer, and a nonmagnetic layer positioned therebetween. A nonmagnetic spacer means is positioned between the plurality of tri-layer readers for electrically connecting the plurality of tri-layer readers in series such that a single CPP sense current flows serially through the read head. The two free layers in each of the plurality of tri-layer readers preferably have magnetization directions which are oriented substantially antiparallel to each other and parallel to an air bearing surface (ABS) in a quiescent state. A bias is then applied to each of the plurality of tri-layer readers perpendicular to the ABS. As a result, the two free layers in each of the plurality of tri-layer readers have biased magnetization directions substantially orthogonal with respect to each other.

In another embodiment, the differential read head includes a single tri-layer reader operating in a current perpendicular to plane (CPP) mode. The tri-layer reader comprises two free layers with a nonmagnetic layer positioned therebetween. The nonmagnetic layer is adjusted to have a substantially similar width at the ABS to a transition width of the magnetic medium. The differential read head further includes biasing means positioned with respect to the tri-layer reader for biasing a magnetization of the free layers substantially parallel to the ABS.

Although the present invention has been described with reference to preferred embodiments, workers skilled in the art will recognize that changes may be made in form and detail without departing from the spirit and scope of the invention.

The invention claimed is:

1. A differential read head comprising:
   a plurality of tri-layer readers operating in a current perpendicular to plane (CPP) mode, the plurality of tri-layer readers each comprising a first free layer, a second free layer, and a nonmagnetic layer positioned therebetween; and
   nonmagnetic spacer means for defining an intrinsic linear resolution of the read head and for electrically connecting the plurality of tri-layer readers in series such that a single CPP sense current representing a differential signal flows serially through the read head.

2. The differential read head of claim 1, wherein a magnetization of the first free layer is antiparallel to a magnetization of the second free layer in a quiescent state.

3. The differential read head of claim 2, wherein quiescent state magnetizations of the first and second free layers are antiparallel due to shape anisotropy.

4. The differential read head of claim 1, further comprising:
   biasing means for producing a biasing field perpendicular to an air bearing surface of the differential reader.

5. The differential read head of claim 4, wherein a biasing direction of the biasing means is generally perpendicular to quiescent state magnetizations of the first and second free layers.

6. The differential read head of claim 5, wherein the two free layers have biased magnetizations oriented substantially orthogonal with respect to each other.

7. The differential read head of claim 6, wherein magnetizations of the first and second free layers rotate in response to flux emanated from a rotating disc.

8. The differential read head of claim 1, wherein one of the plurality of tri-layer readers is a tunneling tri-layer reader.

9. The differential read head of claim 1, wherein one of the plurality of tri-layer readers is a spin valve tri-layer reader.

10. The differential read head of claim 1, further comprising:
    a sense current source for passing a sense current perpendicular to a plane of the plurality of tri-layer readers and the nonmagnetic spacer means to detect a change in resistance across the differential read head.

11. A differential read head having an air bearing surface (ABS) for confronting a surface of a magnetic medium, the differential read head comprising:
    first and second tri-layer readers, each tri-layer reader including two free layers with a nonmagnetic layer positioned between the two free layers;
    a nonmagnetic spacer which defines an intrinsic linear resolution of the read head and which electrically connects the first and second tri-layer readers in series such that a single CPP sense current representing a differential signal flows serially through the read head; and
    biasing means for producing biasing fields for the first tri-layer reader and the second tri-layer reader substantially perpendicular with respect to the ABS and substantially antiparallel with respect to each other.

12. The differential read head of claim 11, wherein the two free layers in each tri-layer reader have biased magnetizations oriented substantially orthogonal with respect to each other.

13. The differential read head of claim 11, wherein the biasing means includes a permanent magnet positioned on a side of the first and second tri-layer readers opposite the ABS.

14. The differential read head of claim 11, wherein the biasing means includes antiferromagnetic (AFM) layers exchange coupled to the tri-layer readers on opposite sides of the tri-layer readers along a track width direction.

15. The differential read head of claim 14, wherein a nonmagnetic spacer separates each AFM layer from the tri-layer readers such that a thickness of the nonmagnetic spacer is adjustable to vary an exchange coupling strength between the AFM layers and the tri-layer readers.

16. The differential read head of claim 11, further comprising:
a sense current source for passing a sense current perpendicular to a plane of the two tri-layer readers and the nonmagnetic spacer to detect a change in resistance across the differential read head.

17. A differential read head having an air bearing surface (ABS) for confronting a surface of a magnetic medium, the differential read head comprising:
a tri-layer reader operating in a current perpendicular to plane (CPP) mode, the tri-layer reader comprising two free layers with a nonmagnetic spacer positioned therebetween, the nonmagnetic spacer having a width substantially similar at the ABS to a transition width of the magnetic medium;
biasing means positioned with respect to the tri-layer reader for biasing a magnetization of the free layers substantially parallel to the ABS; and
a sense current source for passing a sense current representing a differential signal perpendicular to a plane of the two free layers and the nonmagnetic spacer to detect a change in resistance across the differential read head.

18. The differential read head of claim 17, wherein the biasing means includes a permanent magnet having a magnetization set parallel to the ABS.

19. The differential read head of claim 17, wherein the biasing means includes an antiferromagnetic layer exchange coupled to each of the free layers.

20. The differential read head of claim 17, wherein the nonmagnetic layer is a tunnel barrier.

21. The differential read head of claim 17, wherein the nonmagnetic layer is a nonmagnetic metal.

22. The differential read head of claim 17, wherein the width of the nonmagnetic spacer is about 20–100 nm.

* * * * *